US009639777B1

(12) United States Patent
Moloney et al.

(10) Patent No.: US 9,639,777 B1
(45) Date of Patent: May 2, 2017

(54) SYSTEMS AND METHODS FOR PROVIDING AN IMAGE CLASSIFIER

(71) Applicant: Linear Algebra Technologies Limited, Dublin (IE)

(72) Inventors: David Moloney, Dublin (IE); Alireza Dehghani, Dublin (IE)

(73) Assignee: LINEAR ALGEBRA TECHNOLOGIES LIMITED, Dublin (IE)

( * ) Notice: Subject to any disclaimer, the term of this patent is extended or adjusted under 35 U.S.C. 154(b) by 0 days.

(21) Appl. No.: 14/973,272

(22) Filed: Dec. 17, 2015

(51) Int. Cl.
*G06K 9/62* (2006.01)
*G06K 9/66* (2006.01)
*G06K 9/00* (2006.01)

(52) U.S. Cl.
CPC ....... *G06K 9/6212* (2013.01); *G06K 9/00288* (2013.01); *G06K 9/621* (2013.01); *G06K 9/6269* (2013.01); *G06K 9/66* (2013.01)

(58) Field of Classification Search
CPC ... G06K 9/6212; G06K 9/00288; G06K 9/621
USPC ........................................................ 382/160
See application file for complete search history.

(56) References Cited

U.S. PATENT DOCUMENTS

2008/0112613 A1\* 5/2008 Luo ..................... G06K 9/0061
382/167
2008/0253622 A1\* 10/2008 Tosa ................... G06K 9/00604
382/117

OTHER PUBLICATIONS

Belongie et al: "Matching Shapes", IEEE, 2001.\*
Dalal, N. and Triggs, B., "Histograms of Oriented Gradients for Human Detection," International Conference on Computer Vision and Pattern Recognition, San Diego, United States, IEEE Computer Society, vol. 2, 9 pages (Jun. 2005).
Dehghani, A. and Moloney, D., "Speed improvement of object recognition using Boundary-Bitmap of histogram of oriented Gradients," International Conference on Image, Vision and Computing (ICIVC), 6 pages (Aug. 3-5, 2016).
Dehghani, et al., "Object Recognition Speed Improvement Using Bitmap-Hog," IEEE International Conference on Image Processing (ICIP), 5 pages (Sep. 25-28, 2016).
Dziri, et al., "Gesture recognition on smart cameras," CEA LIST—Embedded Computing Laboratory, F-91191, Gif-sur-Yvette, France, 15 pages (2013).
Flohr, et al., "PedCut: an iterative framework for pedestrian segmentation combining shape models and multiple data cues," Proc. of the British Machine Vision Conference, Bristol, UK, 11 pages (2013).
Zhu, et al., "AverageExplorer: Interactive Exploration and Alignment of Visual Data Collections," ACM Transactions on Graphics, vol. 33, No. 4, 11 pages (Aug. 2014).

\* cited by examiner

*Primary Examiner* — Ruiping Li
(74) *Attorney, Agent, or Firm* — Wilmer Cutler Pickering Hale and Dorr LLP

(57) ABSTRACT

Systems and methods are provided for image classification using histograms of oriented gradients (HoG) in conjunction with a trainer. The efficiency of the process is greatly increased by first establishing a bitmap which identifies a subset of the pixels in the HoG window as including relevant foreground information, and limiting the HoG calculation and comparison process to only the pixels included in the bitmap.

20 Claims, 11 Drawing Sheets

SYSTEMS AND METHODS FOR PROVIDING AN IMAGE CLASSIFIER

FIELD OF THE APPLICATION

This present application relates generally to computer vision processing, and more specifically to efficient classification of images.

BACKGROUND

The field of computer vision often requires classifiers that are trained to detect objects such as faces and people, with a view to enabling applications that interact with people and real-world objects. A variety of classifiers exist, as computer vision researchers are consistently seeking more resource-efficient methods for accurately locating and identifying various objects in images.

One known method of identifying a particular class of object, described in FIG. 1, uses histograms of oriented gradients (HoG) in conjunction with training images and a learning system. HoG has been used to detect humans against a variety of backgrounds, as well as faces, animals, vehicles, and other objects. Because HoG uses a relatively compact reference descriptor, it has been successfully used in real-time to classify objects in streaming video. It has also been demonstrated to enable robust detection in the presence of rotations, scaling, and variations in terms of lighting conditions.

FIG. 1 illustrates a process 100 known in the art for classifying objects in images using HoG in conjunction with a support vector machine (SVM) algorithm—fittingly referred to in the art as HoG/SVM. The process as described uses the parameters identified by Dalal and Triggs in their 2005 paper: "Histograms of oriented gradients for human detection," *International Conference on Computer Vision and Pattern Recognition*, Vol. 2, pp. 886-893, June 2005, which is herein incorporated by reference in its entirety.

First, gradient values are calculated for each pixel within a particular cell (step 102 in FIG. 1). As shown in FIG. 2, which illustrates the process, a defined rectangular HoG detection window 202 is applied to a portion of the image, which divides the pixels into discrete cells 204. An HoG cell 204 may, for example, comprise 8 pixels on each side for a total of 64 (8-by-8) pixels per cell 204, although larger or smaller cell sizes may be chosen in some implementations. For each cell 204, a magnitude and orientation of a gradient is calculated. A variety of filters may be applied to calculate these values. For example, as one implementation, the magnitude of the gradient |G| may be given according to the intensity values of its adjacent pixels:

$$|G|=|G_x|+|G_y|=|G_{x+1}-G_{x-1}|+|G_{y+1}-G_{y-1}|.$$

And the orientation θ may be given according to the tangent of the horizontal x and vertical y intensities:

$$\theta=\arctan(|G_{y+1}-G_{y-1}|/|G_{x+1}-G_{x-1}|)$$

To create the histogram, the orientation angles θ are broken up into some number of bins. In this example, the range of 0° to 180° is broken into nine bins of 20° each. Each intensity value |G| is added to the bin associated with its orientation angle θ (step 104 in FIG. 1). The resulting HoG cell descriptor, illustrated as 206 in FIG. 2, has 9 values each with a minimum of zero and a maximum of 128 times the maximum pixel intensity value.

Each of the cell descriptors 206 is then aggregated into block descriptors 210 (step 106 in FIG. 1), based on each 2-by-2 block 208 of four cells. Because every block 208 of cells is used, a cell 204 not on the edge of the window 202 will appear in four different blocks 208, and therefore its descriptor 206 will be included in four different block descriptors 212.

Each block descriptor 210, including the descriptors 206 of each of the four cells 204 in the block 208, is normalized according to the descriptors in that block (step 108 in FIG. 1). A variety of normalization algorithms can be used, many of which are discussed in the Dalai and Triggs 2005 paper referenced above. The result of this process is a normalized block descriptor 212 for each block 208, a set of histogram data representing 36 data elements per block. Because the normalization depends on the values of the four descriptors 206 in a particular block descriptor 210, the normalized values associated with a particular cell 206 may be different in each normalized block descriptor 212 that includes that cell.

For a 64-by-128 pixel window 202, the complete HoG descriptor 214 representing the normalized block descriptors 212 comprises 105 normalized blocks of histogram data: a total of 3,780 data values. This complete descriptor 214 is fed into the SVM classifier (step 110 in FIG. 1), which has previously evaluated training images according to the same parameters. The training images may be any appropriate set of training data for the objects being evaluated, such as the MIT and INRIA image data sets described in Dalai and Triggs 2005 paper. Other publicly available or proprietary training images can be used.

The HoG computation is performed by repeatedly stepping a window, 64 pixels wide by 128 pixels high across in the illustrated example, across a source image frame and computing the HoG descriptor as outlined in the previous section. As the HoG calculation contains no intrinsic sense of scale and objects can occur at multiple scales within an image, the HoG calculation is stepped and repeated across each level of a scale pyramid.

FIG. 3 illustrates a window 302 being stepped across each level 304 of the scale pyramid 306. Each level 304 represents a further scaled-down copy of the image that is being scanned. The scaling factor between each level in the scale pyramid between one level and the next is commonly 1.05 or 1.2. The image is repeatedly down-scaled until the scaled source frame can no longer accommodate a complete HoG window.

The closed form for the number of pixels in the scaling pyramid is given by an expression based on s. s is the scale multiplier for the total number of pixels in the scale pyramid:

$$s = \frac{\alpha^{-m} - \alpha}{1 - \alpha}$$

α is the scaling factor used between pyramid levels. m=log(W/H)/log(α), where W and H are the respective width and height of the input image/video frame. The total number of pixels to consider in the scale pyramid is therefore s*W*H.

As can be seen in FIG. 2 and shown in the calculation above, the HoG descriptor for a system using 9D histograms for each of the 7-by-15 4-by-4 blocks in the image produces a 3.78 kB descriptor for each 64-by-128 window that is examined in the upcoming image.

The images used to train such classifiers are typically rectangular as a by-product of the 2D image sensor arrays used to capture images. Add to this the simplicity to stepping a rectangular descriptor across a rectangular source image and convolving to detect a match and it is easy to see why this paradigm has taken root. While some objects, such as furniture, may indeed be square or rectangular, most objects of interest in classifying are not easily representable by simple geometric shapes. Therefore, a rectangular reference image is a poor match to such objects. Indeed, using a rectangular reference image means that significant additional work has to be done to convolve pixels that are not relevant to the matching task, and furthermore these pixels mean that some of the background surrounding the object of interest are aliased into the descriptor used to match images, thus confounding and degrading the accuracy of the matching operation.

The computational cost of each HoG data set is very high. One estimate is made by Dziri, Chevobbe, and Darouich in their 2013 paper: "Gesture recognition on smart camera," CEA LIST—Embedded Computing Laboratory, 2013. For example, to apply HoG to a 42-by-42 pixel region of interest requires the following operations: 11,664 addition, 1,296 multiplication, 5,200 division, 16 square root, and 5184 arctangent. The computation requires numerous costly and complex mathematical operations like division, square root, and arctangent, which take multiple cycles to implement on a conventional sequential processor in software. The computation also requires large numbers of more common mathematical operations like addition and multiplication, which typically execute in as little as one clock cycle. The computational costs are compounded by the fact that performing a brute-force search by stepping an HoG template for comparison over the entire image is even more computationally expensive depending on the resolution of the input image. Furthermore, in scenarios where objects may be seen at a range of distances, it is often necessary to search candidate windows of different sizes, further increasing the computational cost.

HoG/SVM is a very expensive operation. Many optimizations, from changing the scale factor to modifying the block-size in which the HoG window is stepped across the scaled source image, can be used to prune the search space and hence limit the computational effort. These factors combined mean that robust real-time HoG is confined to very high specification desktop systems that often offload computations to a high performance general processing unit (GPU). This pushes the power costs far beyond the bounds of mobile devices such as phones, tablets and mobile robots.

While it is possible to subsample the input image and perform a range of optimizations for mobile platforms, this often comes at a huge loss in terms of matching accuracy rendering the mobile implementation of very limited utility. Nonetheless, further optimizations to limit the computational expense of HoG processes are desired.

SUMMARY

In accordance with the disclosed subject matter, systems and methods are provided for image classification using HoG in conjunction with a trainer. The efficiency of the process is greatly increased by first establishing a bitmap which identifies a subset of the pixels in the HoG window as including relevant foreground information, and limiting the HoG calculation and comparison process to only the pixels included in the bitmap.

The disclosed embodiments include a computer-implemented method for image classification. The method comprises: generating, from a set of training images, a non-rectangular silhouette representing a relevant portion of an image window; generating, from the silhouette, a non-rectangular bitmap identifying fewer than all of the cells within a rectangular detection window, the rectangular detection window having a predetermined cell width and cell height; receiving an image for classification, the image including a cell width and cell height; applying the rectangular detection window to a portion of the image having the cell width and cell height of the rectangular detection window, wherein applying the detection window includes identifying cells within the image portion matching the identified cells of the non-rectangular bitmap; for each of the identified cells within the image portion, generating a histogram of orientations of the pixels within the cell; establishing overlapping cell blocks, each cell block having a plurality of contiguous identified cells from the image portion; generating, for each cell block, a descriptor including a histogram for each of the identified cells in the cell block, wherein each histogram within the descriptor is normalized to all of the histograms within the descriptor; and evaluating the generated descriptors against the set of training images in order to determine whether to identify the image portion as including a class of object associated with the set of training images.

In some embodiments, the method further comprises: re-scaling the image to a different cell width and cell height; and applying the rectangular detection window to a portion of the re-scaled image having the cell width and cell height of the rectangular detection window.

In some embodiments, the method further comprises generating the non-rectangular silhouette by one of averaging the set of training images, applying a computer vision algorithm, or applying deep learning to determine the relevant portion of the image window.

In some embodiments, the method further comprises generating the non-rectangular silhouette by: determining intensity values of all pixels in each position for each training image from the set of training images; adding the intensity values of all the pixels for each position from the set of training images to generate resulting values; and dividing the resulting values for each position from the set of training images by a number of training images from the set of training images, In some embodiments, the method further comprises, for each of the identified cells within the image portion, generating a histogram of orientations of the pixels within the cell by: calculating gradients, each having a magnitude and a corresponding orientation; associating each corresponding orientation to one of a plurality of bins; and adding each magnitude to the one of the plurality of bins associated with the corresponding orientation.

In some embodiments, the method further comprises providing each cell block as a two-by-two of the contiguous identified cells from the image portion.

In some embodiments, the method further comprises generating, for each cell block, a descriptor by concatenating the histogram for each of the identified cells in the cell block.

In some embodiments, the method further comprises determining that the class of object is one of: a person; a face; a non-rectangular geometric shape; or a non-geometric shape.

The disclosed embodiments include a computing device for image classification. The computing device comprises a memory configured to store a set of training images; a non-rectangular silhouette that represents a relevant portion of an image window from the set of training images; and a non-rectangular bitmap that identifies fewer than all of the cells within a rectangular detection window, the rectangular detection window having a predetermined cell width and cell height. The computing device also comprises a hardware accelerator coupled to the memory, the hardware accelerator configured to: receive as input an image for classification, the image including a cell width and cell height; apply the stored rectangular detection window to a portion of the image having the cell width and cell height of the rectangular detection window by identifying cells within the image portion that match the identified cells of the non-rectangular bitmap; for each of the identified cells within the image portion, generate and store a histogram of orientations of the pixels within the cell; and establish overlapping cell blocks, each cell block having a plurality of contiguous identified cells from the image portion. The computing device also comprises a processor coupled to the hardware accelerator and to the memory, the processor configured to: generate, for each cell block, a descriptor including a histogram for each of the identified cells in the cell block, wherein each histogram within the descriptor is normalized to all of the histograms within the descriptor; and evaluate the generated descriptors against the stored set of training images in order to determine whether to identify the image portion as including a class of object associated with the set of training images. The memory, hardware accelerator, and/or processor can be further configured to carry out any and all of the steps described with respect to any of the above embodiments.

The disclosed embodiments include a non-transitory computer readable medium. The non-transitory computer readable medium has executable instructions operable to cause a data processing apparatus to: generate, from a set of training images, a non-rectangular silhouette representing a relevant portion of an image window; generate, from the silhouette, a non-rectangular bitmap identifying fewer than all of the cells within a rectangular detection window, the rectangular detection window having a predetermined cell width and cell height; receive an image for classification, the image including a cell width and cell height; apply the rectangular detection window to a portion of the image having the cell width and cell height of the rectangular detection window by identifying cells within the image portion matching the identified cells of the non-rectangular bitmap; for each of the identified cells within the image portion, generate a histogram of orientations of the pixels within the cell; establish overlapping cell blocks, each cell block having a plurality of contiguous identified cells from the image portion; generate, for each cell block, a descriptor including a histogram for each of the identified cells in the cell block, wherein each histogram within the descriptor is normalized to all of the histograms within the descriptor; and evaluate the generated descriptors against the set of training images in order to determine whether to identify the image portion as including a class of object associated with the set of training images. The executable instructions can be further operable to cause the data processing apparatus to carry out any and all of the steps described with respect to any of the above embodiments.

The present invention will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

DESCRIPTION OF DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

The present invention makes use of conditional processing using a bitmap which encodes those portions of an image used to train a classifier. The bitmap is derived by any suitable means. For example, the bitmap can be derived by averaging the images in a training data-set. As another example, the bitmap can be derived using computer vision algorithms or deep learning to determine a location and extent of an object to be detected in an image. These means produce a silhouette of the object, which is then thresholded in order to produce a bitmap. The bitmap may also take into account the underlying block structure used in the histogram of oriented gradients (HoG) computations.

Figure 4:
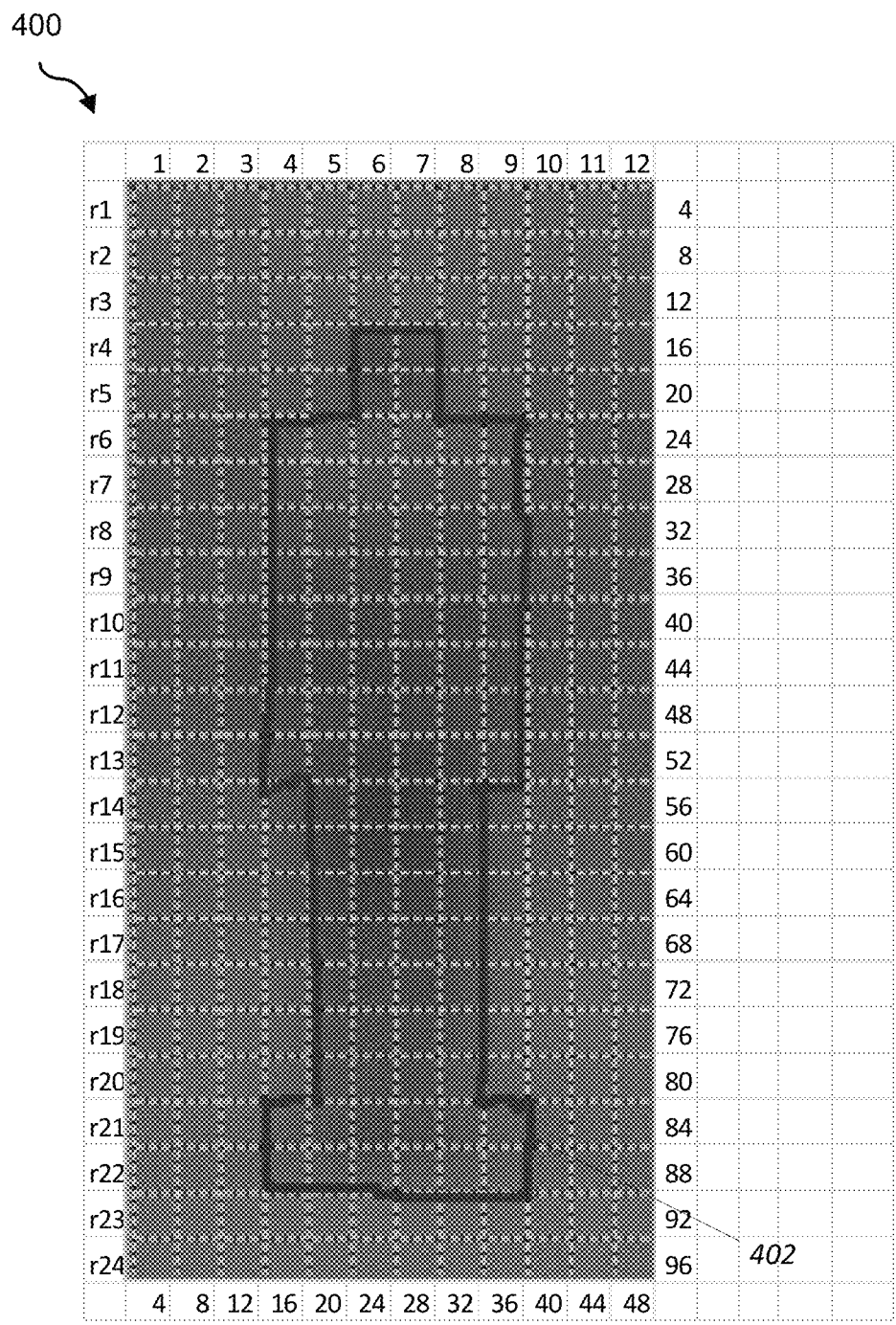
FIG. 4 illustrates a silhouette produced by averaging a set of training images in accordance with embodiments of the present invention.

FIG. 4 illustrates a plot having a silhouette generated from the average of the INRIA pedestrian detection image dataset, described with respect to the Dalal and Triggs 2005 paper referenced above. The plot shows a 48-by-96 pixel image 400, which is divided into 4-by-4 cells, for a total of 288 cells (48/4-by-96/4=12-by-24=288 4-by-4 cells). Of the 288 cells, only 92 are included in the foreground silhouette 402 produced by averaging the images in the dataset, representing 32% (92/288) of the full area of the image.

The foreground silhouette can be generated in any number of suitable ways. For example, the silhouette can be generated by adding together the intensity values of all the pixels in each position within the training images, and then dividing the resulting values by the number of images. The following paper describes "average images" that can be generated by this process: Jun-Yan Zhu et al., "AverageExplorer: Interactive Exploration and Alignment of Visual Data Collections," ACM Transactions on Graphics, Vol. 33, No. 4, August 2014. For example, the MATLAB functions imadd( ) and imdivide( ) can be used to perform these functions on a dataset and output the result to a bitmap file for review. The silhouette outline can be generated automatically based on the result of pixel-by-pixel averaging of the dataset, computer vision, deep learning, or other suitable means or combination of means.

Figure 2:
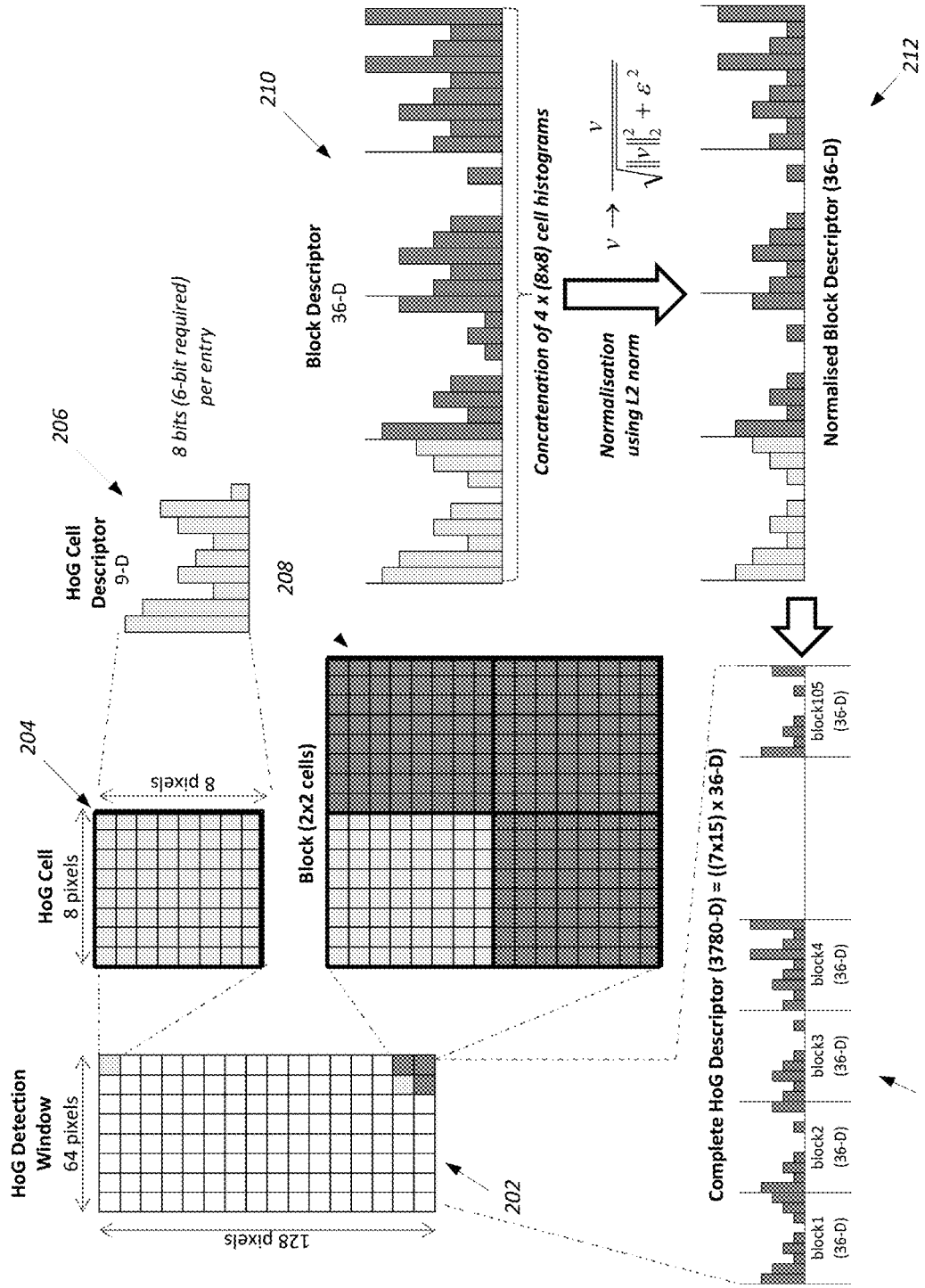
FIG. 2 illustrates an implementation of the HoG/SVM process as practiced absent a bitmap as known in the art.
Figure 3:
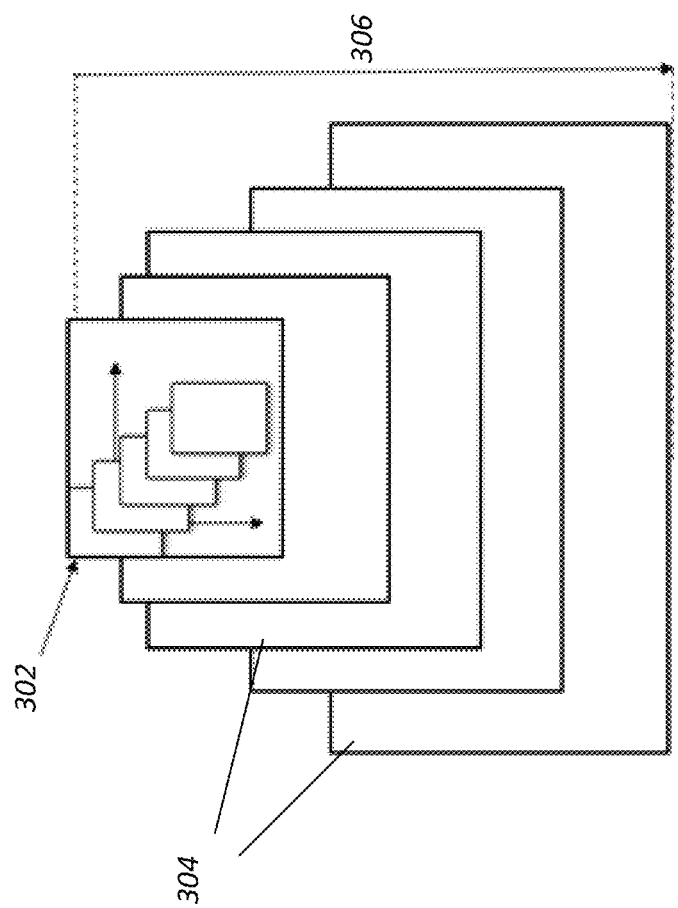
FIG. 3 illustrates a pyramid scaling scheme as known in the art.
Figure 5:
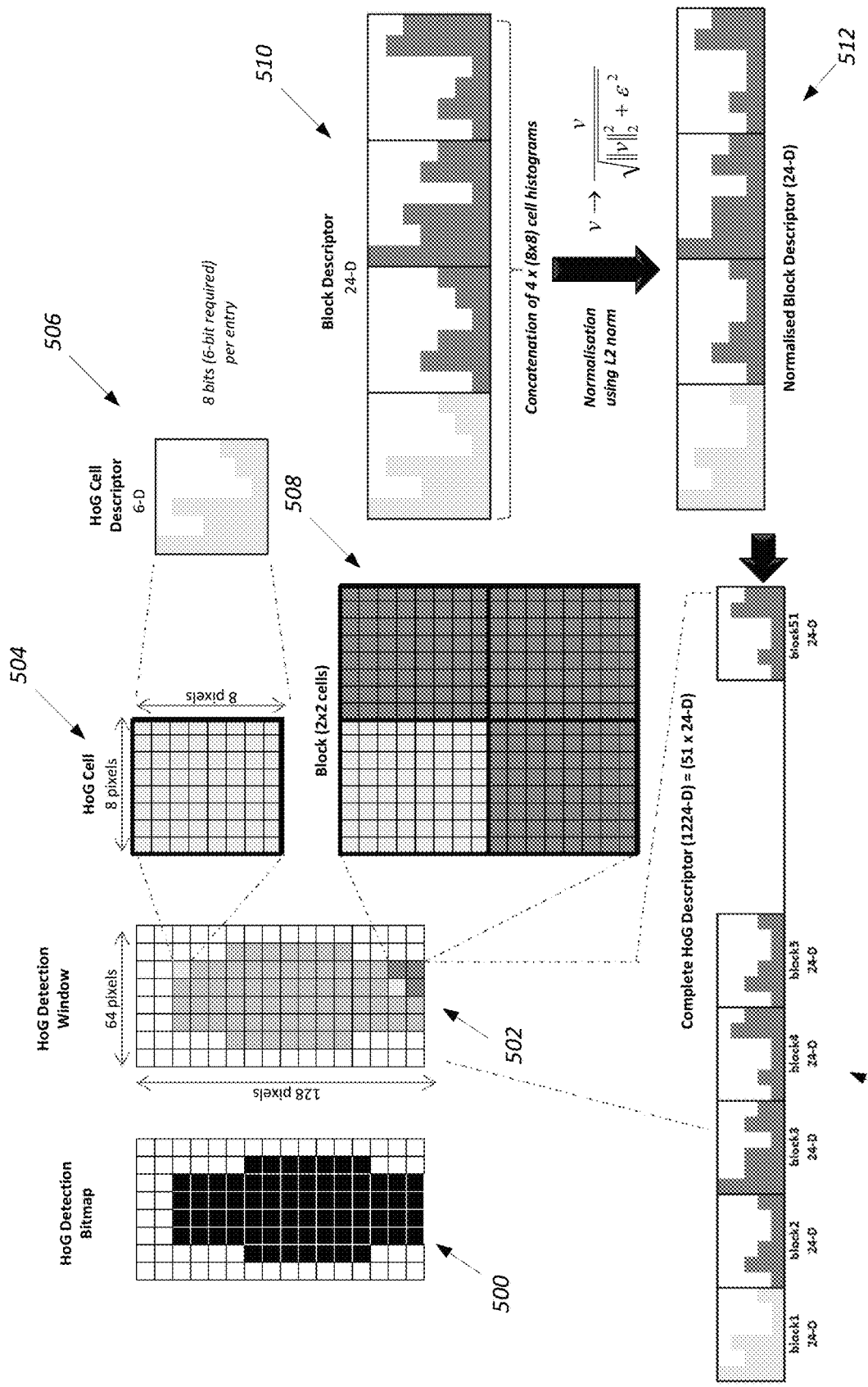
FIG. 5 illustrates an implementation of the bHoG/SVM process applying a bitmap in accordance with embodiments of the present invention.

The silhouette is then translated into an HoG detection bitmap 500 as shown in FIG. 5, in which the numbers 502-514 are similar to those used above, 202-214, with respect to the illustrated process of FIG. 2. Here, of the original 128 cells included in the HoG detection window 502, only 74 are included as foreground cells on the bitmap 500, representing 58% (74/128) of the total area of the window 502. Furthermore, in creating the histogram data 506, six orientation bins of 30° each are used, instead of nine bins of 20° to further reduce the total size of the complete HoG descriptor 514. While covering the full detection window 502 requires 105 overlapping 2-by-2 blocks, covering the bitmap requires only 74 of such 2-by-2 blocks 508.

As shown in FIG. 5, the complete bHoG descriptor includes only 1776 total reference values (74-by-24-D), reducing the size of the descriptor by a factor of 3 compared to the full HoG descriptor described above. These descriptors are compared via SVM or another suitable learning algorithm to reference images that have been similarly reduced in size by the silhouette 400 of FIG. 4, yielding a further increase in efficiency.

By comparing only the relevant areas of the present image to only the relevant areas of the reference images, a significant reduction in process cost and complexity can be realized. In one experimental example, a bHoG/SVM classifier was trained using only those portions of the INRIA image database that did not contain background information and compared to a HoG/SVM classifier trained in the conventional manner. Results showed a 75% workload reduction using the INRIA image set for pedestrian detection, referenced above. A similar workload reduction was found using the Daimler Pedestrian Segmentation Benchmark Dataset introduced by F. Flohr and D. M. Gavrila, "PedCut: an iterative framework for pedestrian segmentation combining shape models and multiple data cues," Proc. of the British Machine Vision Conference, Bristol, U K, 2013.

The results shown apply irrespective of the higher-level optimizations that can be made to reduce the dimensionality of the search space and are easily accelerated in hardware leading to a potential 4× speed-up in a hardware accelerated bHoG/SVM detector, with corresponding 4× reduction in memory storage, memory bandwidth and power consumption.

Figure 1:
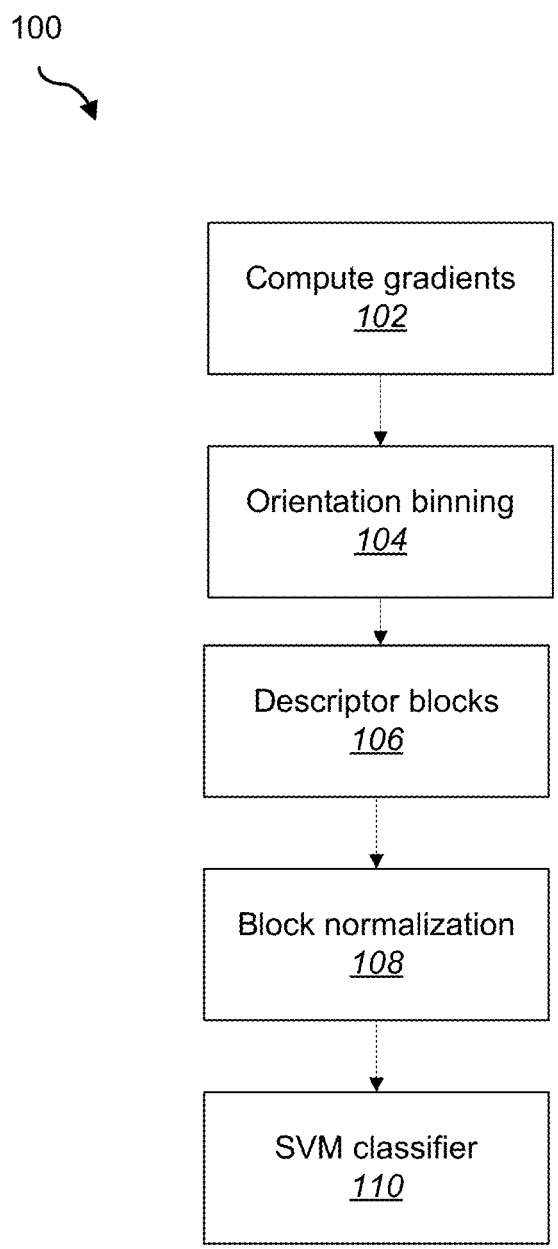
FIG. 1 is a flowchart describing an implementation of a HoG/SVM classification process as known in the art.
Figure 6:
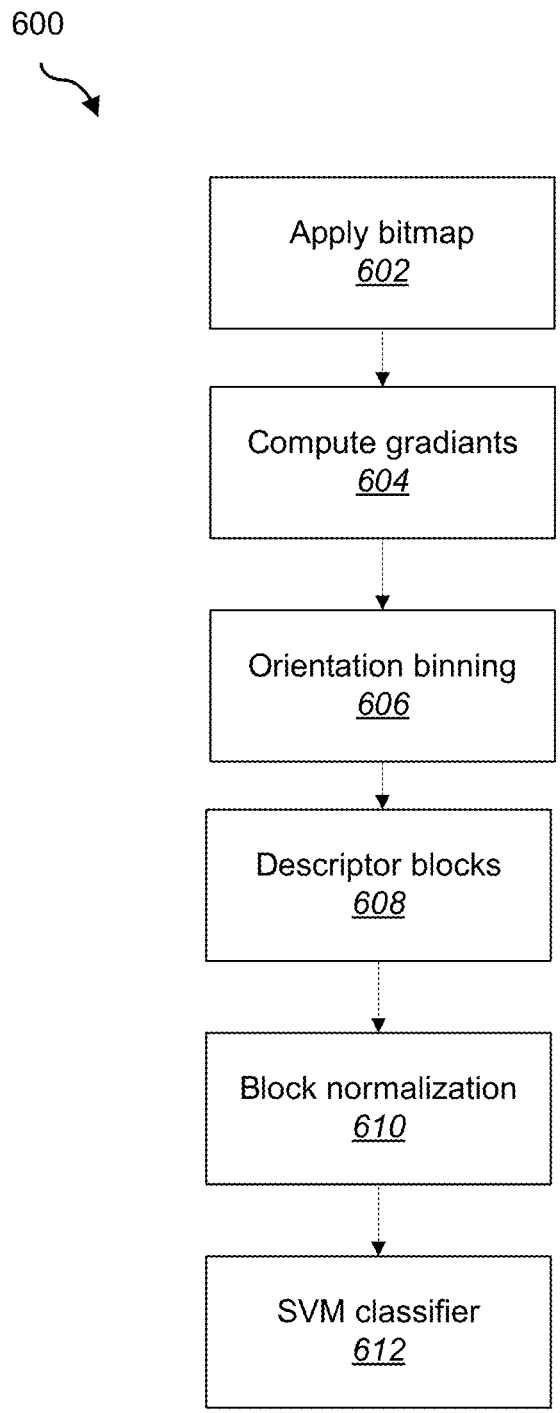
FIG. 6 is a flowchart describing an implementation of a HoG/SVM classification process in accordance with embodiments of the present invention.

FIG. 6 is a flowchart describing an implementation of an HoG/SVM classification process as herein described. Process 600 starts at step 602 with an image to be classified. A detection window containing an arbitrarily-shaped bitmap of an arbitrarily-shaped silhouette is applied to a portion of the image. For example, a rectangular detection window containing a non-rectangular bitmap of a non-rectangular silhouette is applied to a portion of the image. The detection window is made up of cells and has a predetermined cell width and cell height. The bitmap identifies fewer than all of the cells within the regular detection window. The silhouette, and thus the bitmap, can be any suitable arbitrary shape, including any geometric shape (other than a rectangular shape), non-geometric shape, or combination of geometric and non-geometric shapes. The applying process identifies only the cells within the image portion that match the identified cells of the bitmap. Next, at step 604, the process calculates gradient values (magnitudes and orientation angles) for each pixel within an identified cell within the image portion. At step 606, the process then breaks up the orientation angles into a suitable number of bins, and adds each magnitude to the bin associated with its orientation angle. Each resulting HoG cell descriptor is then aggregated into block descriptors at step 608. At step 610, each block descriptor, including its descriptors, are normalized using any suitable normalization algorithm. The resulting complete HoG descriptor, representing the normalized block descriptors, is then fed into the SVM classifier at step 110. In FIG. 6, steps 604, 606, 608, 610, and 612 each performs a similar function as described above in connection with respective steps 102, 104, 106, 108, and 110 in FIG. 1, but only on data corresponding to the identified cells of the bitmap corresponding to the silhouette, thereby resulting in optimizations, increased efficiencies, and a reduction in process cost and complexity as described above.

Figure 7:
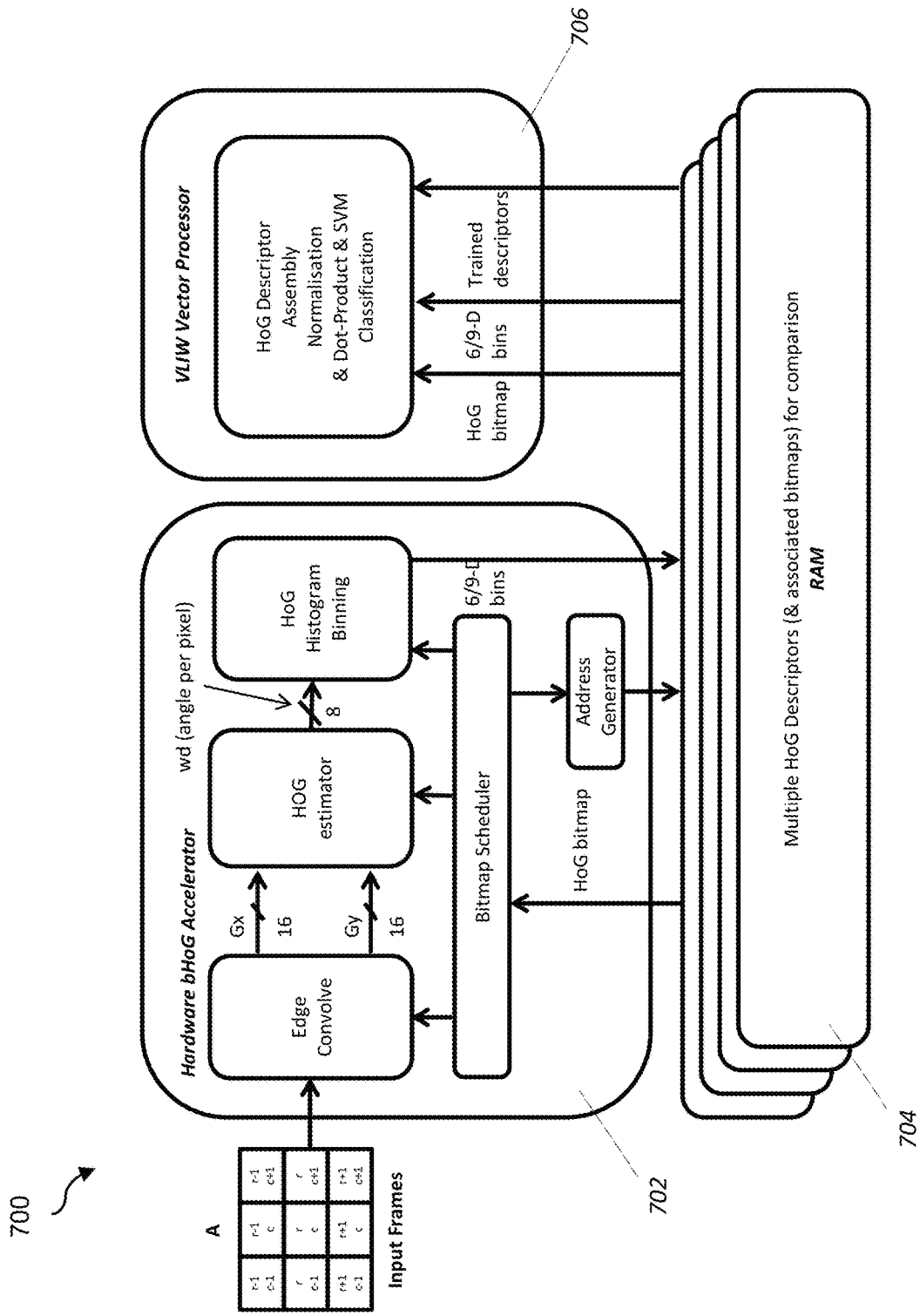
FIG. 7 is a schematic depicting hardware configured in accordance with embodiments of the present invention.

FIG. 7 shows a possible hardware block 700 for accelerated bHoG calculations as herein described. Input frames including an array of intensity values for a given cell and all adjacent cells are sent to a hardware bHoG accelerator 702, which includes modules for carrying out all necessary functions for computing gradients and generating orientation bins as earlier described. Certain modules may address and modify multiple HoG descriptors and associated bitmaps (that is, bHoG descriptors) stored in system memory 704. The remainder of the steps of the bHoG/SVM process (generating descriptor blocks, block normalization, and SVM classification of bHoG data) can be carried out by a VLIW processor 706 referencing the bHoG descriptors in system memory 704.

Figure 8:
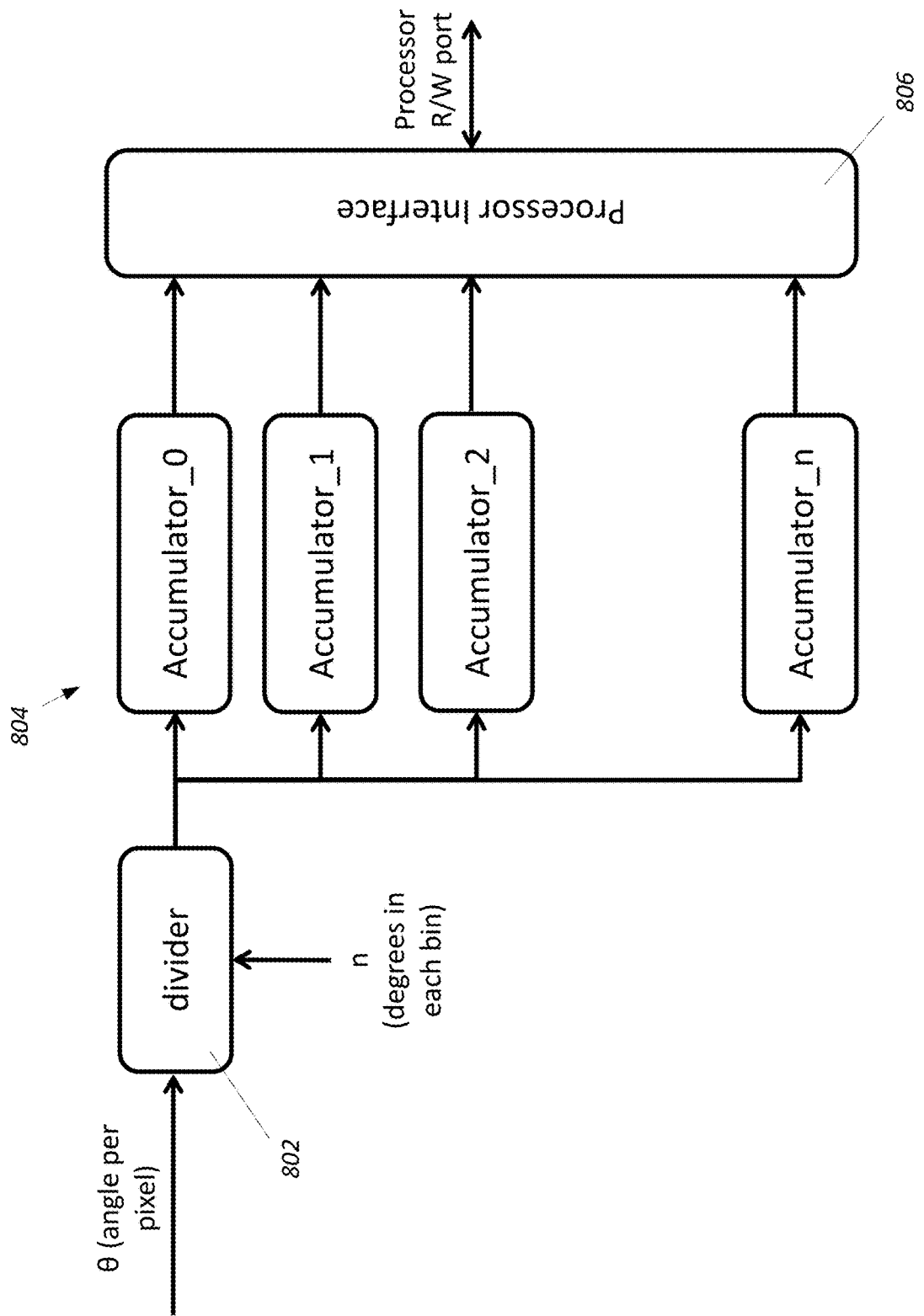
FIG. 8 is a schematic depicting hardware configured in accordance with embodiments of the present invention.

In FIG. 8, a possible hardware block to accelerate bHoG calculations and histogram binning is shown, where the angle calculations are performed and packed into memory for subsequent histogram binning in software. An integer divider 802 divides the θ angle computed for each pixel by the number of degrees associated with each histogram bin in order to output a bin number—an integer between 0 and N, where N is the number of histogram bins. This output is then used to select from the plurality of accumulators 804 in the histogram block to be updated on the next clock edge. The contents of these accumulators can then be read out at the end of the block of the bHoG calculation via a memory-mapped processor interface 806.

Figure 9:
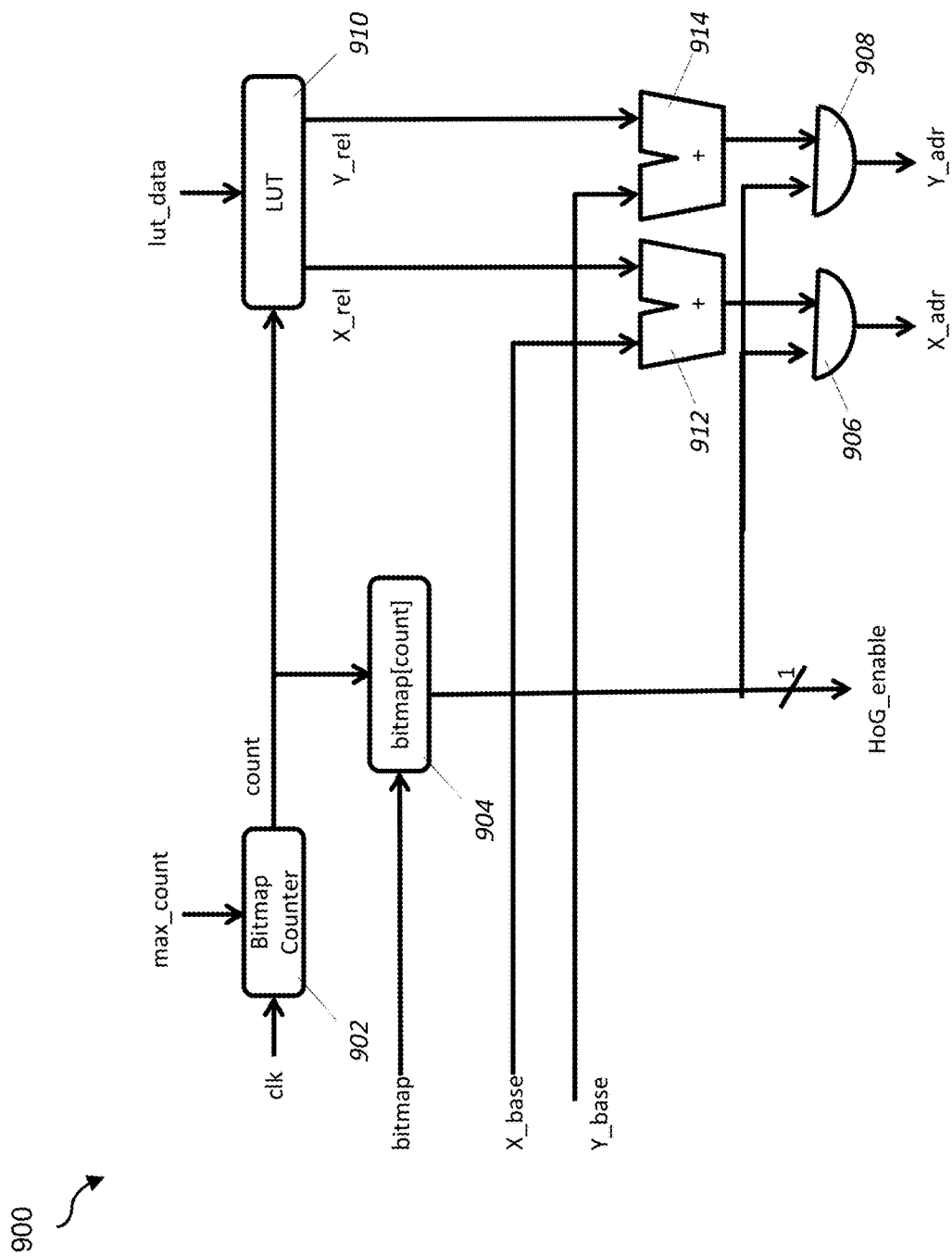
FIG. 9 is a schematic depicting hardware configured in accordance with embodiments of the present invention.

This hardware can be extended by the addition of a bitmap scheduler 900 to support sparse bitmaps as shown in FIG. 9. A bitmap counter 902 counts up to the max_count limit—the number of bits in the bitmap corresponding to the selected cell-size. The output of the counter is the "count" and is used to look up a bit from the n-bit bitmap array 904 which is loaded via the bitmap input before circuit operation commences. The output of the bitmap array lookup 904 is the "HoG-enable" variable which is used to control the HoG computation block as well as the output of the "X_adr" and "Y_adr" outputs used to look up the required pixels for the HoG operation in memory by enabling the output AND gates 906 and 908. The inputs to these AND gates are generated by looking up "X_rel" and "Y_rel" relative addresses from a lookup-table 910 which is loaded before the circuit commences operation via the "lut_data" input. The "X_rel" and "Y_rel" addresses are added to the "X_base" and "Y_base" inputs via a pair of adders 912 and 914.

Figure 10:
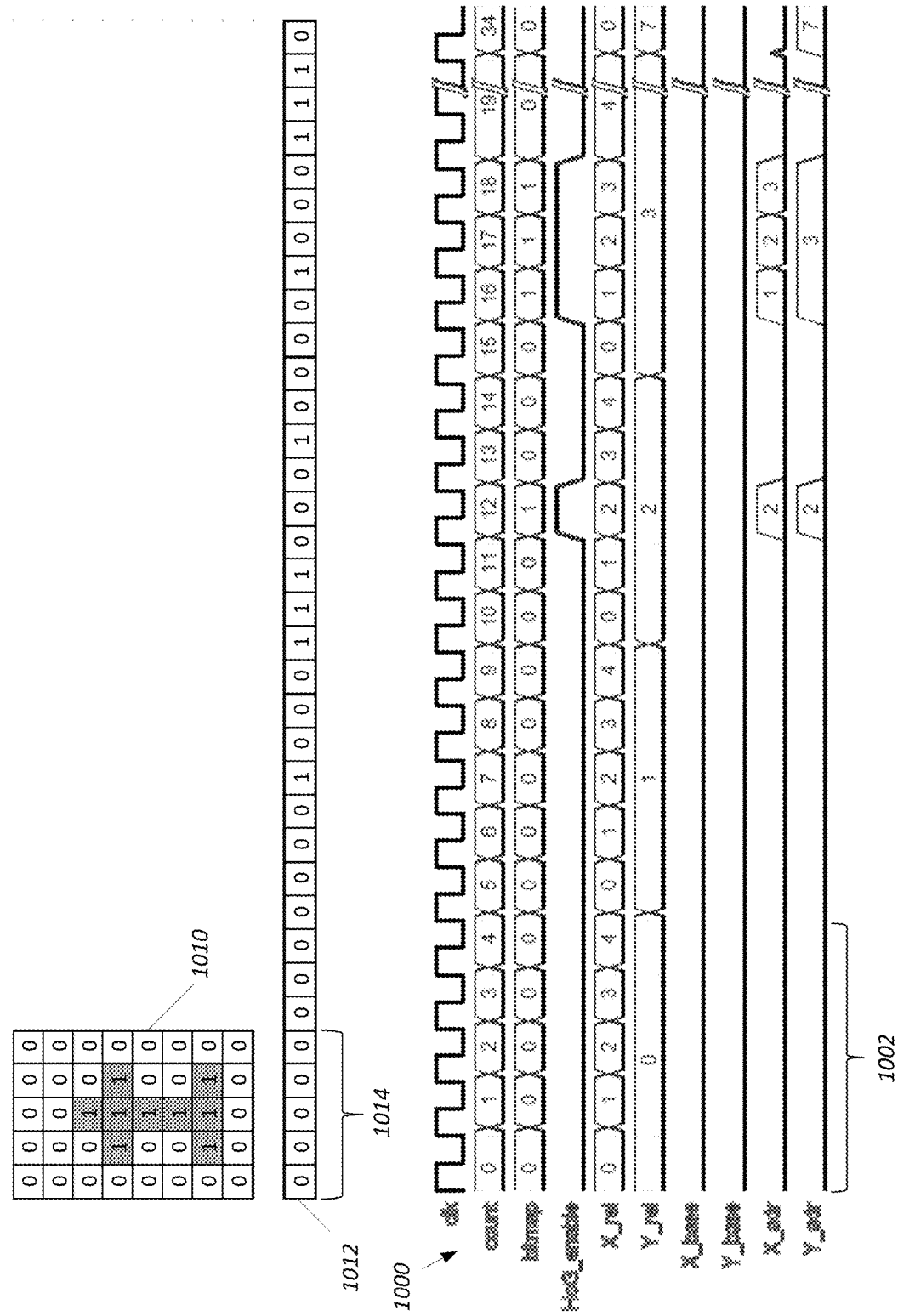
FIG. 10 is a timing diagram depicting the operation bitmap scheduler for a typical bitmap in accordance with embodiments of the present invention.

FIG. 10 is a timing diagram 1000 depicting the operation bitmap scheduler for an exemplary bitmap 1010. A bit stream 1012 is illustrated for the bitmap 1010, with the bits representing the first row of the bitmap 1010 marked on the bit stream 1012 as first row 1014. The portion of the timing diagram 1000 corresponding to the first row 1014 is marked as first timing portion 1002. As illustrated, a clock signal "clk" acts as a timer by sending alternating high and low signals as clock ticks. Within this context, various other signals representing different variables are sent. Most notably, and in accordance with the block diagram from FIG. 9, the "HoG enable" signal as described above acts as a mask for the "X_adr" and "Y_adr" signals. If the "HoG enable" signal is a high value, corresponding to a 1 value for the "bitmap" at that position, then the "X_adr" signal will be the sum of the "X_rel" and "X_base" signals and the "Y_adr" signal will be the sum of the "Y_rel" and "Y_base" signals. Else, if the "HoG enable" signal is low, corresponding to a 0 value for the "bitmap" at that position, then the "X_adr" and "Y_adr" signals will also be low (that is, signaling a zero value or no value).

Figure 11:
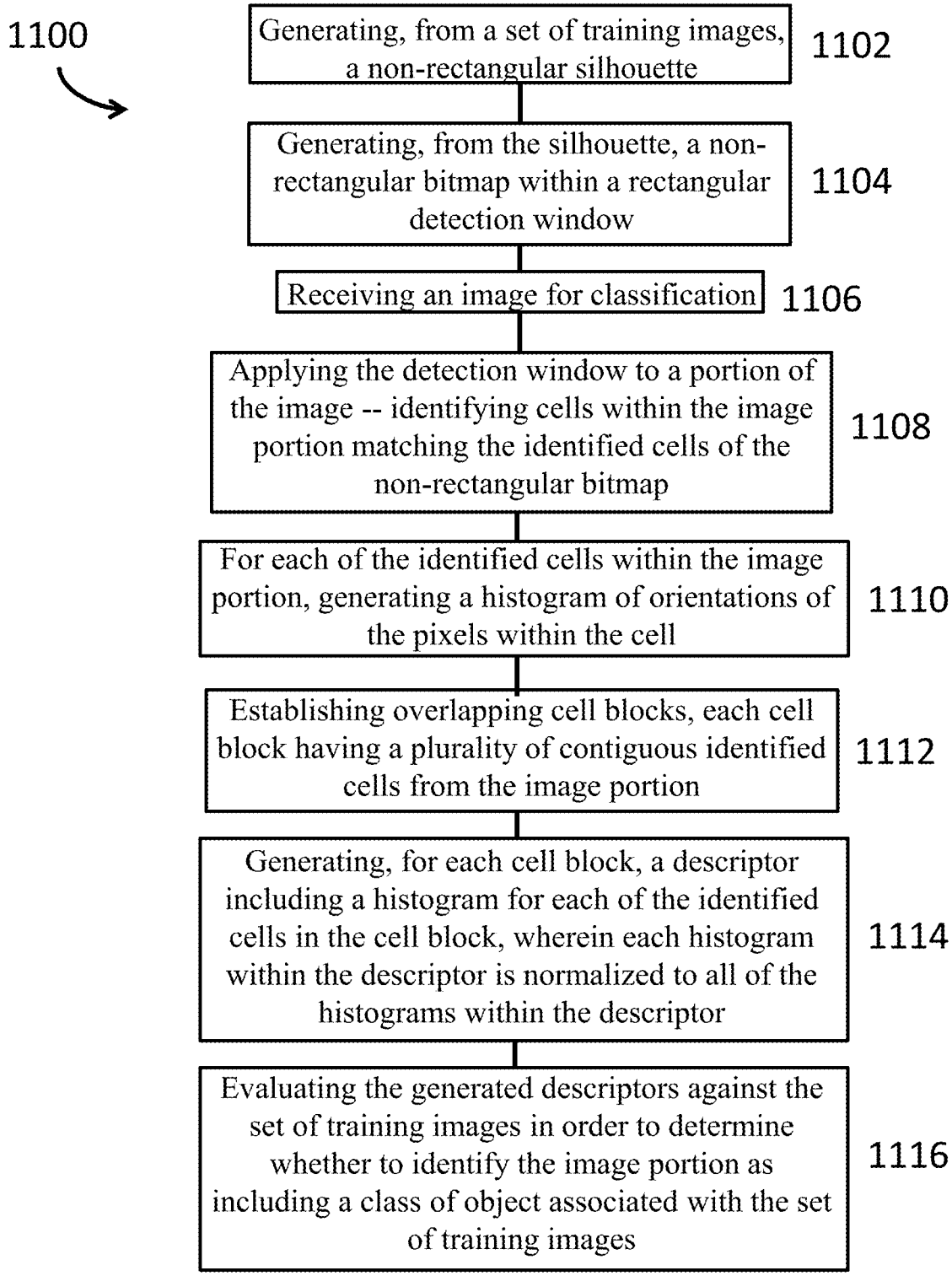
FIG. 11 is a flowchart describing an implementation of a HoG/SVM classification process in accordance with embodiments of the present invention.

FIG. 11 is a flowchart describing an implementation of an HoG/SVM classification process as herein described. Process 1100 starts at step 1102 where the process generates, from a set of training images, an arbitrarily-shaped (such as a non-rectangular) silhouette representing a relevant portion of an image window. At step 1104, the process generates, from the silhouette, an arbitrarily-shaped (such as a non-rectangular) bitmap identifying fewer than all of the cells within a rectangular detection window, the rectangular detection window having a predetermined cell width and cell height. At step 1106, the process receives an image for classification, the image including a cell width and cell height. At step 1108, the process applies the rectangular detection window to a portion of the image having the cell width and cell height of the rectangular detection window. This includes identifying cells within the image portion matching the identified cells of the non-rectangular bitmap. At step 1110, for each of the identified cells within the image portion, the process generates a histogram of orientations of the pixels within the cell. At step 1112, the process establishes overlapping cell blocks, each cell block having a plurality of contiguous identified cells from the image portion. At step 1114, the process generates, for each cell block, a descriptor including a histogram for each of the identified cells in the cell block. Each histogram within the descriptor is normalized to all of the histograms within the descriptor. At step 1116, the process evaluates the generated descriptors against the set of training images in order to determine whether to identify the image portion as including a class of object associated with the set of training images.

In order to minimize the memory requirements associated with bitmap storage, it could be compressed using run-length coding for each run of ones in each line of the bitmap if determined to be advantageous. In this case, a hardware and/or software run-length decoder would be used to reconstruct the bitmap from the run-length encoded version.

It will be appreciated that whilst several different arrangements have been described herein, that the features of each may be advantageously combined together in a variety of forms to achieve advantage.

In the foregoing specification, the application has been described with reference to specific examples. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an."

The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A computer-implemented method for image classification, comprising:
   generating, from a set of training images, a non-rectangular silhouette representing a relevant portion of an image window;
   generating, from the silhouette, a non-rectangular bitmap identifying fewer than all of the cells within a rectangular detection window, the rectangular detection window having a predetermined cell width and cell height;
   receiving an image for classification, the image including a cell width and cell height;
   applying the rectangular detection window to a portion of the image having the cell width and cell height of the rectangular detection window, wherein applying the detection window includes identifying cells within the image portion matching the identified cells of the non-rectangular bitmap;
   for each of the identified cells within the image portion, generating a histogram of orientations of the pixels within the cell;
   establishing overlapping cell blocks, each cell block having a plurality of contiguous identified cells from the image portion;
   generating, for each cell block, a descriptor including a histogram for each of the identified cells in the cell block, wherein each histogram within the descriptor is normalized to all of the histograms within the descriptor; and
   evaluating the generated descriptors against the set of training images in order to determine whether to identify the image portion as including a class of object associated with the set of training images.

2. The method of claim 1, further comprising:
   re-scaling the image to a different cell width and cell height; and
   applying the rectangular detection window to a portion of the re-scaled image having the cell width and cell height of the rectangular detection window.

3. The method of claim 1, wherein generating the non-rectangular silhouette comprises one or averaging the set of training images, applying a computer vision algorithm, or applying deep learning to determine the relevant portion of the image window.

4. The method of claim 1, wherein generating the non-rectangular silhouette comprises:
   determining intensity values of all pixels in each position for each training image from the set of training images;
   adding the intensity values of all the pixels for each position from the set of training images to generate resulting values; and
   dividing the resulting values for each position from the set of training images by a number of training images from the set of training images.

5. The method of claim 1, wherein, for each of the identified cells within the image portion, generating a histogram of orientations of the pixels within the cell, comprises:
   calculating gradients, each having a magnitude and a corresponding orientation;
   associating each corresponding orientation to one of a plurality of bins; and
   adding each magnitude to the one of the plurality of bins associated with the corresponding orientation.

6. The method of claim 1, wherein each cell block comprises two-by-two of the contiguous identified cells from the image portion.

7. The method of claim 1, wherein generating, for each cell block, a descriptor comprises concatenating the histogram for each of the identified cells in the cell block.

8. The method of claim 1, further comprising determining that the class of object is one of:
   a person;
   a face;
   a non-rectangular geometric shape; or
   a non-geometric shape.

9. A computing device for image classification comprising:
   a memory configured to store a set of training images, a non-rectangular silhouette that represents a relevant portion of an image window from the set of training images, and a non-rectangular bitmap that identifies fewer than all of the cells within a rectangular detection window, the rectangular detection window having a predetermined cell width and cell height;
   a hardware accelerator coupled to the memory, the hardware accelerator configured to:
      receive as input an image for classification, the image including a cell width and cell height,
      apply the stored rectangular detection window to a portion of the image having the cell width and cell height of the rectangular detection window by identifying cells within the image portion that match the identified cells of the non-rectangular bitmap,
      for each of the identified cells within the image portion, generate and store a histogram of orientations of the pixels within the cell, and
      establish overlapping cell blocks, each cell block having a plurality of contiguous identified cells from the image portion; and
   a processor coupled to the hardware accelerator and to the memory, the processor configured to:
      generate, for each cell block, a descriptor including a histogram for each of the identified cells in the cell block, wherein each histogram within the descriptor is normalized to all of the histograms within the descriptor, and
      evaluate the generated descriptors against the stored set of training images in order to determine whether to identify the image portion as including a class of object associated with the set of training images.

10. The computing device claim 9, wherein the hardware accelerator is further configured to:
    re-scale the image to a different cell width and cell height; and
    apply the rectangular detection window to a portion of the re-scaled image having the cell width and cell height of the rectangular detection window.

11. The computing device of claim 9, wherein at least one of the hardware accelerator or the processor is configured to:
    average the set of training images; and
    store the averaged set of training images as the non-rectangular silhouette.

12. The computing device of claim 9, wherein at least one of the hardware accelerator or the processor is configured to:

B1cdetermine intensity values of all pixels in each position for each training image from the set of training images;

add the intensity values of all the pixels for each position from the set of training images to generate resulting values;

divide the resulting values for each position from the set of training images by a number of training images from the set of training images; and store the divided resulting values as the non-rectangular silhouette.

13. The computing device of claim 9, wherein the hardware accelerator configured to, for each of the identified cells within the image portion, generate and store a histogram of orientations of the pixels within the cell, is further configured to:

calculate gradients, each having a magnitude and a corresponding orientation;

associate each corresponding orientation to one of a plurality of bins; and add each magnitude to the one of the plurality of bins associated with the corresponding orientation.

14. The computing device of claim 9, wherein the processor configured to evaluate the generated descriptors against the stored set of training images is further configured to determine whether the class of object is one of:

a person;
a face;
a non-rectangular geometric shape; or
a non-geometric shape.

15. A non-transitory computer readable medium having executable instructions operable to cause a data processing apparatus to:

generate, from a set of training images, a non-rectangular silhouette representing a relevant portion of an image window;

generate, from the silhouette, a non-rectangular bitmap identifying fewer than all of the cells within a rectangular detection window, the rectangular detection window having a predetermined cell width and cell height;

receive an image for classification, the image including a cell width and cell height;

apply the rectangular detection window to a portion of the image having the cell width and cell height of the rectangular detection window by identifying cells within the image portion matching the identified cells of the non-rectangular bitmap;

for each of the identified cells within the image portion, generate a histogram of orientations of the pixels within the cell;

establish overlapping cell blocks, each cell block having a plurality of contiguous identified cells from the image portion;

generate, for each cell block, a descriptor including a histogram for each of the identified cells in the cell block, wherein each histogram within the descriptor is normalized to all of the histograms within the descriptor; and evaluate the generated descriptors against the set of training images in order to determine whether to identify the image portion as including a class of object associated with the set of training images.

16. The non-transitory computer readable medium of claim 15, further comprising executable instructions operable to cause the data processing apparatus to:

re-scale the image to a different cell width and cell height; and apply the rectangular detection window to a portion of the re-scaled image having the cell width and cell height of the rectangular detection window.

17. The non-transitory computer readable medium of claim 15, further comprising executable instructions operable to cause the data processing apparatus to one of average the set of training images, apply a computer vision algorithm, or apply deep learning to generate the non-rectangular silhouette.

18. The non-transitory computer readable medium of claim 15, further comprising executable instructions operable to cause the data processing apparatus to:

determine intensity values of all pixels in each position for each training image from the set of training images;

add the intensity values of all the pixels for each position from the set of training images to generate resulting values; and divide the resulting values for each position from the set of training images by a number of training images from the set of training images to generate the non-rectangular silhouette.

19. The non-transitory computer readable medium of claim 15, further comprising executable instructions operable to cause the data processing apparatus to:

calculate gradients, each having a magnitude and a corresponding orientation;

associate each corresponding orientation to one of a plurality of bins; and add each magnitude to the one of the plurality of bins associated with the corresponding orientation.

20. The non-transitory computer readable medium of claim 15, further comprising executable instructions operable to cause the data processing apparatus to determine whether the class of object is one of:

a person;
a face;
a non-rectangular geometric shape; or
a non-geometric shape.

* * * * *